United States Patent
Vandergraff (10) Patent No.: US 9,265,244 B2
(45) Date of Patent: Feb. 23, 2016

(54) KIT FOR CONVERTING A CLIMBING TREE STAND INTO A CART

(71) Applicant: Brian Charles Vandergraff, Morganton, NC (US)

(72) Inventor: Brian Charles Vandergraff, Morganton, NC (US)

( * ) Notice: Subject to any disclaimer, the term of this patent is extended or adjusted under 35 U.S.C. 154(b) by 282 days.

(21) Appl. No.: 13/773,805

(22) Filed: Feb. 22, 2013

(65) Prior Publication Data

US 2014/0238776 A1 Aug. 28, 2014

(51) Int. Cl.
*A01M 31/02* (2006.01)
*B62B 1/12* (2006.01)
*A01M 31/00* (2006.01)

(52) U.S. Cl.
CPC ............. *A01M 31/02* (2013.01); *A01M 31/006* (2013.01); *B62B 1/12* (2013.01); *B62B 2202/42* (2013.01); *B62B 2205/006* (2013.01); *B62B 2206/006* (2013.01); *Y10T 29/49716* (2015.01)

(58) Field of Classification Search
CPC . A01M 31/006; A01M 31/02; A01M 31/025; A63B 27/00; A63B 27/02; A63B 27/04; B62B 1/12; B62B 2205/10; B62B 2202/42; B62B 1/00; B62B 5/0083; E06C 1/397
See application file for complete search history.

(56) References Cited

U.S. PATENT DOCUMENTS

| | | | |
|---|---|---|---|
| 2,375,338 A * | 5/1945 | Alexander | 280/47.131 |
| 2,426,244 A * | 8/1947 | Sitton | 414/447 |
| 2,979,338 A * | 4/1961 | Dwyer | 280/47.3 |
| 3,860,254 A * | 1/1975 | Wegener | 280/652 |
| 4,321,982 A | 3/1982 | Strickland | |
| 4,440,409 A * | 4/1984 | Margison | 280/47.331 |
| 4,582,165 A * | 4/1986 | Latini | 182/20 |
| 4,822,065 A * | 4/1989 | Enders | 280/47.331 |
| 5,048,850 A * | 9/1991 | McDonald | 280/47.131 |
| 5,181,731 A * | 1/1993 | Gustavsen | 280/47.131 |
| 5,265,780 A * | 11/1993 | Matthews et al. | 224/155 |
| 5,295,556 A | 3/1994 | Mullin | |
| 5,433,291 A | 7/1995 | Shoestock, Sr. | |
| 5,492,196 A | 2/1996 | Michno | |
| 5,624,008 A | 4/1997 | Beardslee, Jr. | |
| 5,727,799 A * | 3/1998 | DiSario | 280/47.3 |
| 5,806,868 A * | 9/1998 | Collins | 280/79.6 |
| 5,882,023 A * | 3/1999 | Swager | 280/47.131 |
| 5,887,676 A * | 3/1999 | Harbin | 182/20 |
| 6,234,499 B1 * | 5/2001 | Irwin et al. | 280/63 |
| 6,505,707 B1 * | 1/2003 | Berry | 182/20 |
| 6,516,918 B2 * | 2/2003 | Hess | 182/20 |
| 6,516,919 B1 * | 2/2003 | Sempel | 182/20 |
| 6,746,039 B2 * | 6/2004 | Perelli et al. | 280/651 |
| 6,811,180 B1 | 11/2004 | Molliere | |
| 6,896,273 B2 * | 5/2005 | Forsberg et al. | 280/79.11 |
| 6,926,292 B1 * | 8/2005 | Weeks | 280/47.331 |
| 7,036,631 B2 * | 5/2006 | Feik et al. | 182/129 |
| 7,306,074 B2 | 12/2007 | Voorhies | |
| 7,484,594 B1 * | 2/2009 | Feliciano et al. | 182/127 |
| 7,849,964 B2 * | 12/2010 | Amacker et al. | 182/136 |

(Continued)

*Primary Examiner* — Colleen M Chavchavadze
(74) *Attorney, Agent, or Firm* — Jeffrey Watson; Grell & Watson Patent Attorneys (57) ABSTRACT

A kit for converting a climbing tree stand into a cart includes a bracket having a first side and a second side. The first side is shaped to attach to a top part of a climbing tree stand. The second side is shaped to attach to a bottom part of the climbing tree stand. At least one wheel with an axle is positioned on the bracket. The bracket converts the climbing tree stand into a cart by attaching the top part of the climbing tree stand to the first side and attaching the bottom part of the climbing tree stand to the second side.

16 Claims, 10 Drawing Sheets

(56) References Cited

U.S. PATENT DOCUMENTS

| | | |
|---|---|---|
| 8,141,887 B1 * | 3/2012 | Poteat .................. 280/47.24 |
| 8,256,794 B1 | 9/2012 | Burton et al. |
| 8,424,639 B1 * | 4/2013 | Davis ........................ 182/20 |
| 8,556,277 B1 * | 10/2013 | Bolinski ............... 280/47.131 |
| 8,678,329 B1 * | 3/2014 | Bryant et al. ............. 248/129 |
| 8,690,167 B1 * | 4/2014 | Huntley et al. ......... 280/47.331 |
| 2004/0222040 A1 | 11/2004 | Zirk |
| 2005/0051999 A1 * | 3/2005 | Bunce et al. ............... 280/652 |
| 2007/0169994 A1 | 7/2007 | Oftedahl |
| 2007/0194560 A1 * | 8/2007 | Zink ......................... 280/652 |
| 2007/0235255 A1 | 10/2007 | Wallace et al. |
| 2008/0197608 A1 * | 8/2008 | Dixon ....................... 280/654 |
| 2009/0178884 A1 * | 7/2009 | Maletestinic et al. ......... 182/20 |
| 2009/0205905 A1 * | 8/2009 | Amacker et al. ............. 182/20 |
| 2009/0229914 A1 * | 9/2009 | Liles ......................... 182/63.1 |
| 2010/0013182 A1 * | 1/2010 | Kergosien et al. ........... 280/204 |
| 2011/0140382 A1 * | 6/2011 | Scheermesser ......... 280/47.131 |
| 2014/0311824 A1 * | 10/2014 | Yoder ........................ 182/20 |

\* cited by examiner

KIT FOR CONVERTING A CLIMBING TREE STAND INTO A CART

FIELD OF THE INVENTION

The present invention relates generally to parts for a tree stand, like a climbing tree stand. More particularly, the present invention relates to a kit for converting a climbing tree stand into a cart.

BACKGROUND OF THE INVENTION

Tree stands or deer stands are open or enclosed platforms used to provide an elevated position in a tree. Tree stands are commonly used in the hunting world, like deer hunting. The platforms are secured to trees in order to elevate the hunter and give the hunter a better vantage point. The majority of the millions of deer hunters in the U.S. use a tree stand. Hunters use many different types of tree stands, like ladder-style tree stands, climbing tree stands, hanging stands, box stands, etc. The instant invention is designed to be utilized with a climbing tree stand.

A climbing tree stand is used by a person to not only provide an elevated position in a tree, but it also aids the user in climbing the tree. Climbing tree stands are typically made of two parts, a bottom part and a top part. The bottom part is the standing platform and the top part is the seat. A strap may be included that connects the top part to the bottom part, so if the bottom falls while in the tree or climbing, the platform doesn't fall all the way to the ground stranding the hunter. Climbing tree stands come in many different shapes and sizes and with many different accessories, like seats, seat backs, arm rests, cushions, footrests, etc. Climbing tree stands have a couple of different styles to connect to the tree. The tree gripping part, or the part that grips the lower portion of the tree, is typically made from a concave shaped piece of metal with teeth or grooves utilized to grip the tree. An adjustable cable portion is wrapped around the tree above the tree gripping part to provide the cantilever forces required to position the top and/or bottom part on the tree.

Before climbing the tree both parts need to be adjusted to the tree so they are level for the hunter to stand and sit on. To climb the tree the back of each part is angled to the tree one at a time and pulled up. Then the part that the hunter is moving is set back level and the next part is moved up. This is done until the person is at the desired height. For safety some hunters strap the tree stand to the tree. To go down the hunter does the same as climbing up except in reverse. Obviously, only trees that have no limbs up to the height desired for hunting will work.

One issue with tree stands and hunting is that tree stands are heavy and bulky, and thus, very difficult to transport. Typical climbing tree stands weigh between 18-30 pounds. The transportation of a tree stand becomes even more difficult for long distances. For example, some public hunting lands restrict the use of motorized vehicles, thereby requiring hunters to manually carry their equipment to the desired hunting location. As most should understand, the more remote the location is or the farther the location is away from human development, the more likely the hunter is to see any game animals, like deer. Thus, most hunters desire their hunting location to be deep into the woods or hunting land. As such, some hunters may walk or bike multiple miles to their desired hunting location. Thus, there is clearly a need to provide a climbing tree stand that is easier to transport, especially for long distances.

Another issue most hunters face is the transportation of the killed game or animal back from the hunting location. As most any person should understand, it is very difficult to transport dead weight, especially for long distances. For example, the average deer weighs around 200 pounds which is extremely difficult for a single person to carry, especially for long distances back from the hunting location. Thus, there is clearly a need to provide a means for transporting the killed game back from the hunting location.

One solution to transporting climbing tree stands is that the top part and bottom part can be sized to nest together and transport like a backpack. One solution to transporting a killed animal back from the hunting location is to use a cart or hauler, or a deer cart. However, no one wants to carry a 30 lb. stand and a 30 lb cart into the woods on each trip. Thus, there is clearly a need to create a light weight, compact, low cost "kit" to convert the typical climbing tree stand into a deer cart/hauler.

The instant invention is designed to address the problems described above and provide a kit for converting a climbing tree stand into a deer cart.

SUMMARY OF THE INVENTION

The instant invention is directed toward a kit for converting a climbing tree stand into a cart. The kit includes a bracket having a first side and a second side. The first side is shaped to attach to a top part of a climbing tree stand. The second side is shaped to attach to a bottom part of the climbing tree stand. At least one wheel with an axle is positioned on the bracket. The bracket converts the climbing tree stand into a cart by attaching the top part of the climbing tree stand to the first side and attaching the bottom part of the climbing tree stand to the second side.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
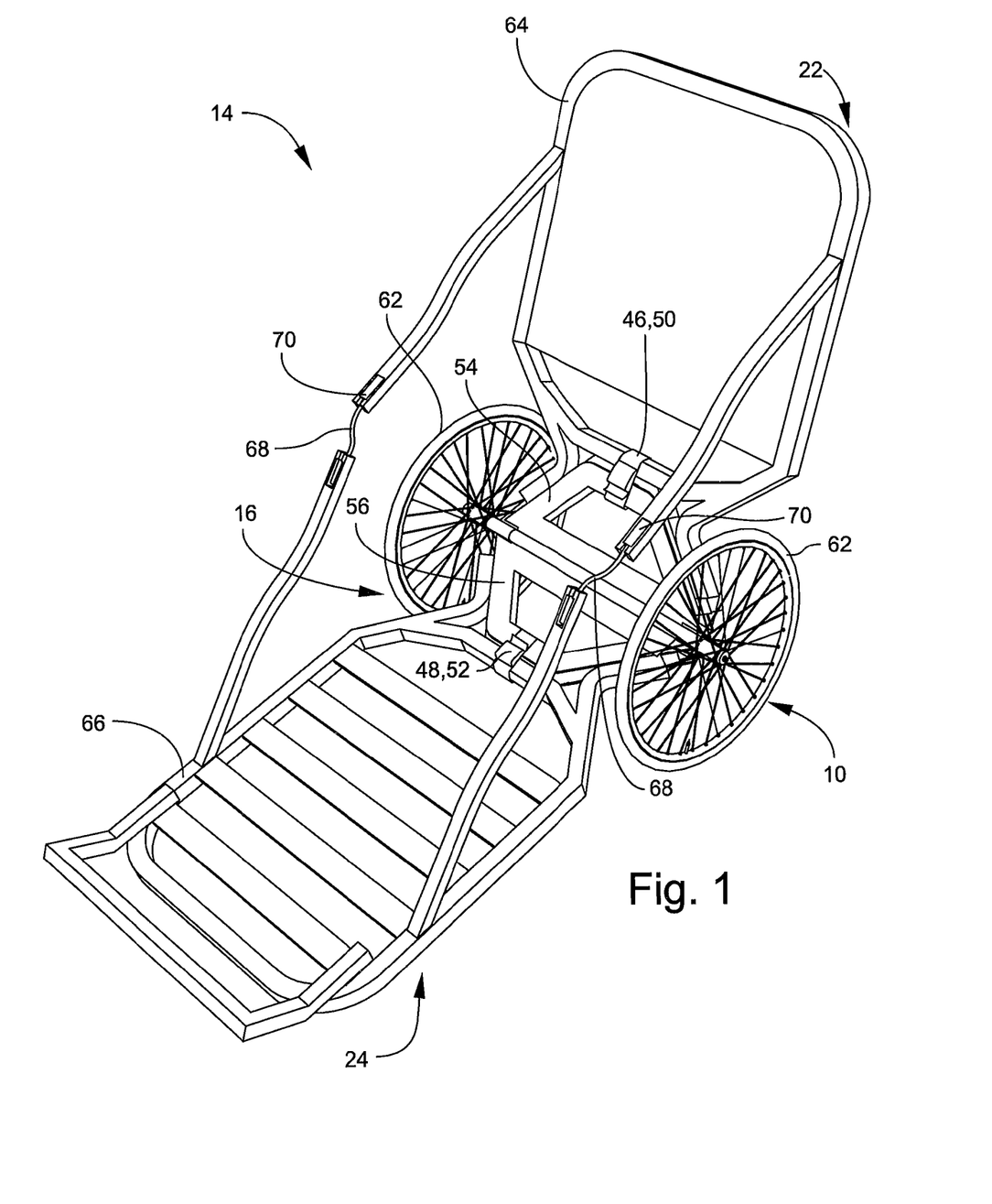
FIG. 1 is a perspective view of a climbing tree stand converted into a cart with a kit according to one embodiment of the instant invention.
Figure 2:
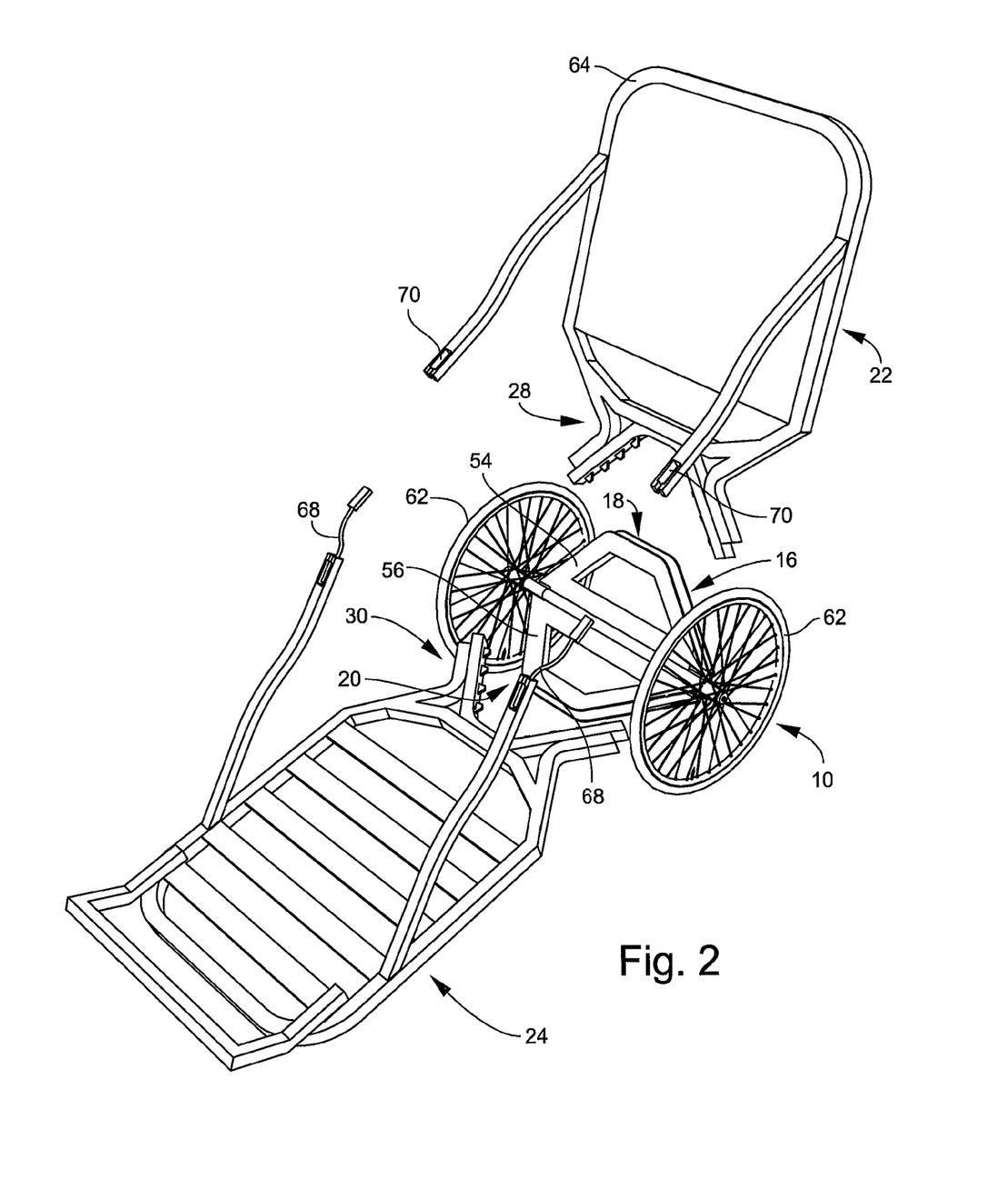
FIG. 2 is a partially disassembled perspective view of the cart from FIG. 1.
Figure 3:
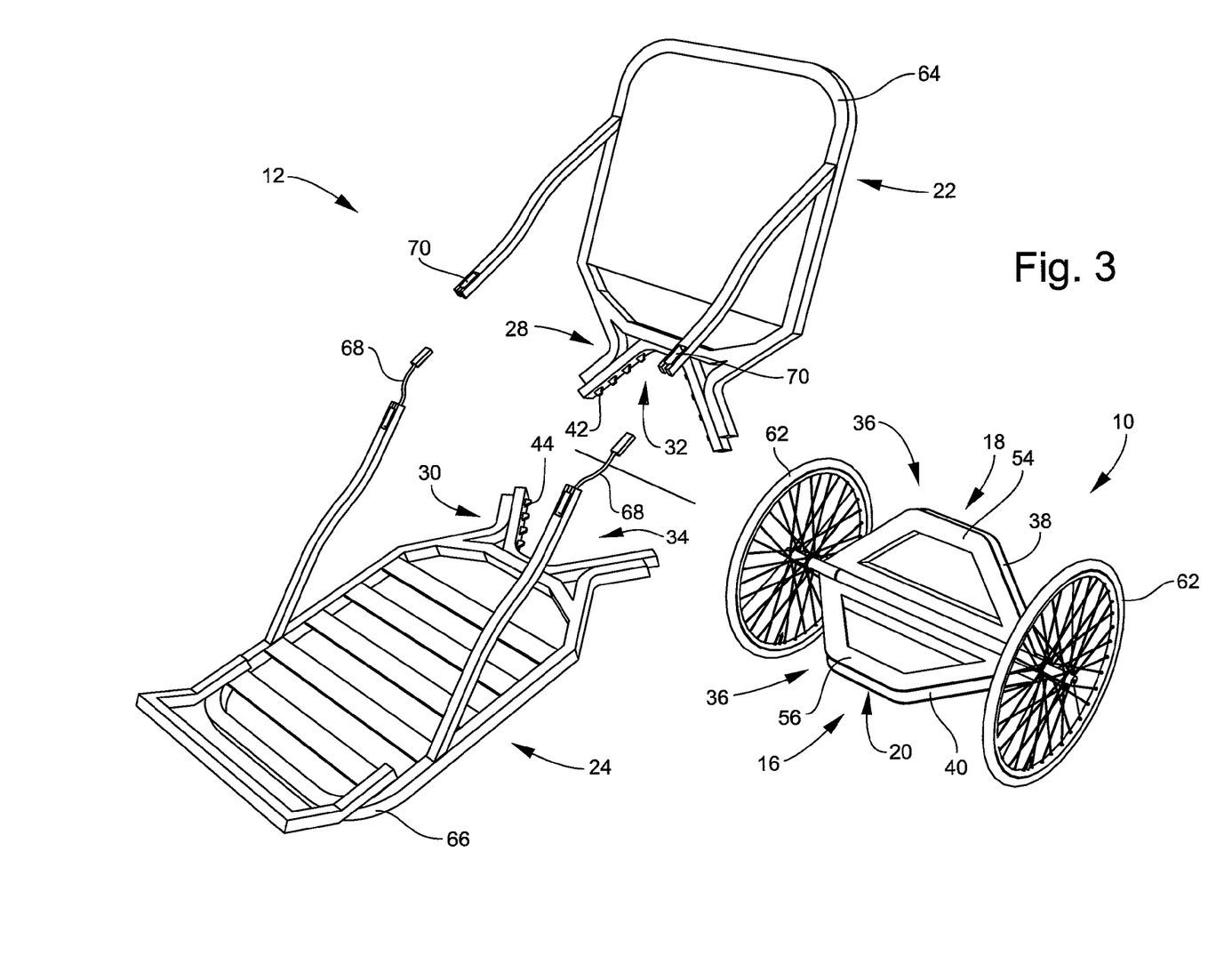
FIG. 3 is another partially disassembled perspective view of the cart from FIG. 1.

Referring to the drawings, wherein like numerals indicate like elements, there is shown in FIG. 1 an embodiment of a kit 10 for converting a climbing tree stand 12 into a cart 14, also known as a hauler, deer cart or deer hauler. As described and shown herein, the kit 10 may be ideally utilized for converting a climbing tree stand into a cart. However, the invention is not so limited, and kit 10 may be utilized for other tree stand types or other devices needed to be converted into a cart. In addition, kit 10 may also be utilized for converting such devices to any type of various carts, vehicles, wagons, scooters, etc. Kit 10 may convert the climbing tree stand 12 into any form of a cart, a hauler, a deer cart, a deer hauler, etc. As discussed herein, kit 10 may be designed with hunters in mind, however, kit 10 may also be utilized by other users with for other various activities requiring a tree stand and/or a cart. Kit 10 may include any parts for converting a climbing tree stand into a cart. In one embodiment, kit 10 may include a bracket 16.

Bracket 16 may be included in kit 10 for converting a climbing tree stand 12 into a cart 14. See FIGS. 1-5 and 8. Bracket 16 may be for connecting the top part 22 of climbing tree stand 12 to bottom part 24 of climbing tree stand 12. Bracket 16 may include any parts or combination of parts for connecting top part 22 to bottom part 24 of climbing tree stand 12. The connection of top part 22 to bottom part 24 of climbing tree stand 12 may convert the stand into the cart 14. Bracket 16 may have a first side 18 and a second side 20. The first side 18 may be shaped to attach to top part 22 of climbing tree stand 12, the second side 20 may be shaped to attach to bottom part 24 of climbing tree stand 12, or vice versa. Although climbing tree stand 12 is shown in the Figures as a certain climbing tree stand, as should be readily understood by those skilled in the art, first side 18 and/or second side 20 of bracket 16 may be shaped to fit any climbing tree stand or other tree stand with a top and bottom part (22 and 24). In operation, the bracket 16 may convert the climbing tree stand 12 into a cart 14 by attaching the top part 22 (also known as the seat climber 64) of the climbing tree stand 12 to first side 18 and attaching the bottom part 24 (also know as the base platform 66) of the climbing tree stand 12 to the second side 20. The bracket 16 may be sized or shaped according to the desired climbing tree stand to be converted. In one embodiment, bracket 16 may have a hexagonal shape. The bracket 16 may be made from a single piece of material cast or stamped out or it may be made from multiple materials attached together, like, by welding. The bracket 16 may be made from any type of material strong enough to support cart 14, including, but not limited to, steel aluminum, alloys, other like materials, etc. In one embodiment, bracket 16 may be made from aluminum tubing, aluminum channels, and/or aluminum rods. For example, bracket 16 may be constructed from Aluminum (6063 T52) u-channel tubing 1.25"×1.25"×0.125" welded together. Such aluminum u-channel may be available as part number 13-63-230 from AAC—All Aluminum Company of Asheville, N.C.

In one embodiment of bracket 16, the first side 18 may be shaped to attach to a tree gripping means 28 of the top part 22 and/or the second side 20 may be shaped to attach to a tree gripping means 30 of the bottom part 24 of climbing tree stand 12. See FIGS. 2-4. The top and bottom tree gripping means (28 and 30) of the climbing tree stand 12 can be any tree gripping means commonly used with tree stands or any tree gripping means developed in the future for tree stands. Thus, as should be readily understood by one skilled in the art, the first side 18 and second side 20 of bracket 16 may be shaped or designed to fit any style, shape or size tree stand or climbing tree stand, including any various style, shape or size of tree gripping means utilized on such various climbing tree stands. In one embodiment, the first side 18 may be shaped to attach to an inner portion 32 of the top tree gripping means 28, and/or the second side 20 may be shaped to attach to an inner portion 34 of the bottom tree gripping means 30. The first side 18 and/or second side 20 may have a convex shape 36. This convex shape of first side 18 and/or second side 20 may be designed to conform to the respective inner portions (32 and 34) of top and/or bottom tree gripping means (28 and 30). Inner portions of standard climbing tree stands are typically concave shaped. In one embodiment, the first side 18 may have a first u-shaped channel 38 and/or the second side 20 may have a second u-shaped channel 40. The first u-shaped channel 38 and/or the second u-shaped channel 40 may be for receiving the respective top and/or bottom tree gripping means (28 and 30). In one embodiment, the first u-shaped channel 38 may be for receiving the teeth 42 of top tree gripping means 28, and/or the second u-shaped channel 40 may be for receiving the teeth 44 of bottom tree gripping means 30.

The first side 18 and second side 20 of bracket 16 may attach to top part 22 and bottom part 24 of climbing tree stand 12. See FIGS. 1-3. The first and second sides (18 and 20) may attach to the respective top and bottom part (22 and 24) of climbing tree stand 12, or vice versa, by any means, including, but not limited to, any brackets, fasteners, nails, screws, pins, locks, straps, ties, the like, and any combinations thereof. As should be readily understood by those skilled in the art, the first side 18 and/or the second side 20 of bracket 16 may be removably attachable to the respective top and/or bottom parts (22 and 24) of climbing tree stand 12, or vice versa. In one embodiment, the first side 18 may be removably attachable to the top part 22 of climbing tree stand 12 via at least one first strap 46, and/or the second side 20 may be removably attachable to the bottom part 24 of the climbing tree stand 12 via at least one second strap 48. The first and second straps 46 and 48 may be similar or they may be different based on the similarities between the connections and the needs of attachment to the top and bottom parts (22 and 24) of the climbing tree stand 12. The first and second straps 46 and 48 may be any straps for removably connecting the first and second sides 18 and 20 with the respective top and bottom parts 22 and 24. In one embodiment, the first strap may include a first cinch strap 50 (could also be a hook and loop type fastener or other like fastener) for securing the first strap 46 around the first side 18 and the top part 22 of the climbing tree stand 12. In another embodiment, the second strap 48 may include a second cinch strap 52 (could also be a hook and loop type fastener or other like fastener) for securing the second strap 48 around the second side 20 and the bottom part 24 of the climbing tree stand 12. The combination of the convex shape 36 of first side 18 with the first u-shaped channel 38 adapted to receive the teeth 42 of top tree gripping means 28, may allow a single first strap 46 anywhere (preferably in the middle) to secure the first side 18 onto the top part 22 or seat climber 64 of climbing tree stand 12. Likewise, the combination of the convex shape 36 of second side 20 with the second u-shaped channel 40 adapted to receive the teeth 44 of bottom tree gripping means 30, may allow a single second strap 48 anywhere (preferably in the middle) to secure the second side 20 onto the bottom part 24 or base platform 66 of climbing tree stand 12. This attachment of first side 18 to top part 22 and/or second side 20 to bottom part 24 with a single removable strap allows for easy conversion back and forth from climbing tree stand 12 to cart 14.

Figure 4:
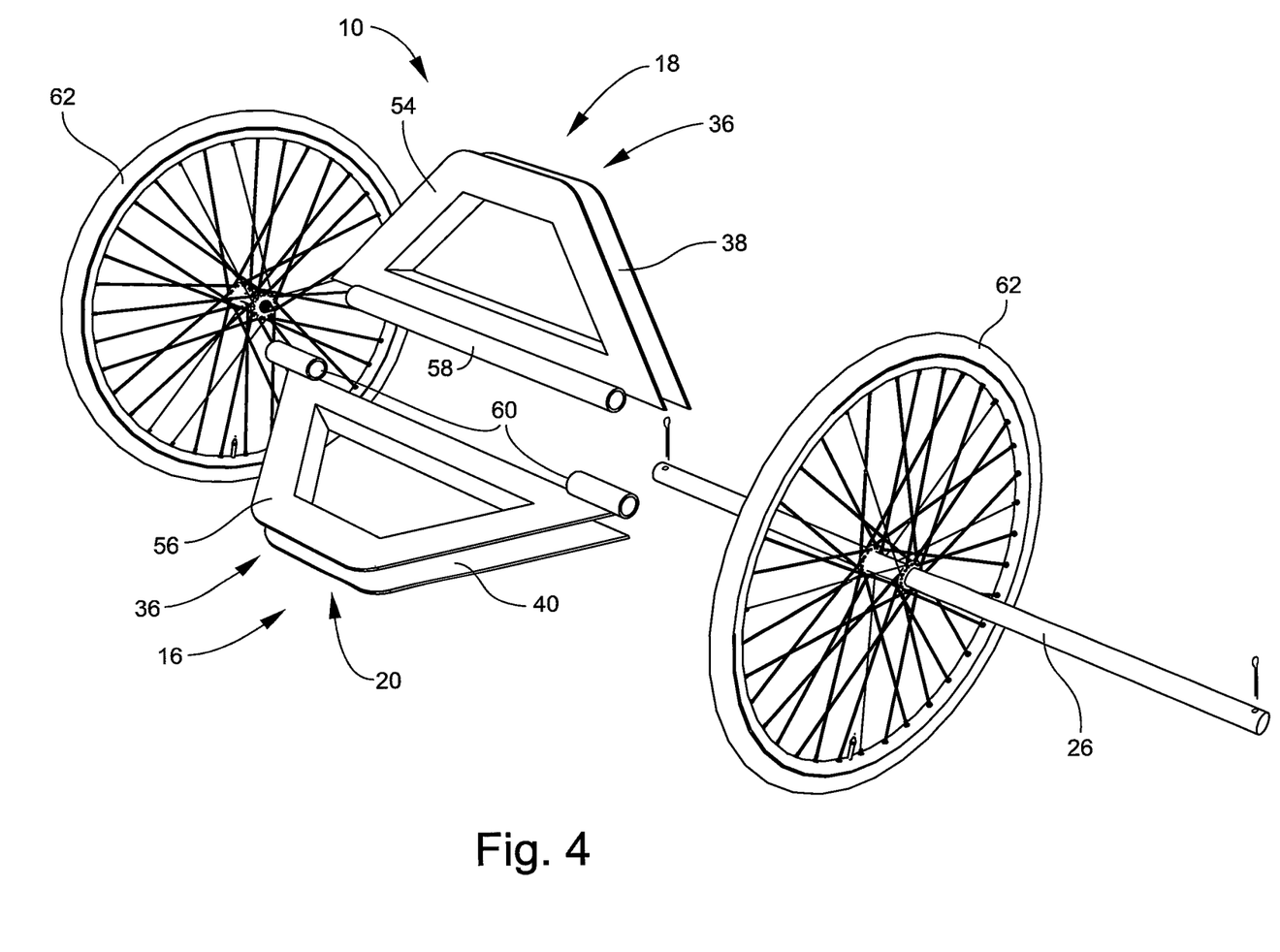
FIG. 4 is a partially disassembled perspective view of the kit for converting a climbing tree stand into a cart according to one embodiment of the instant invention.
Figure 5:
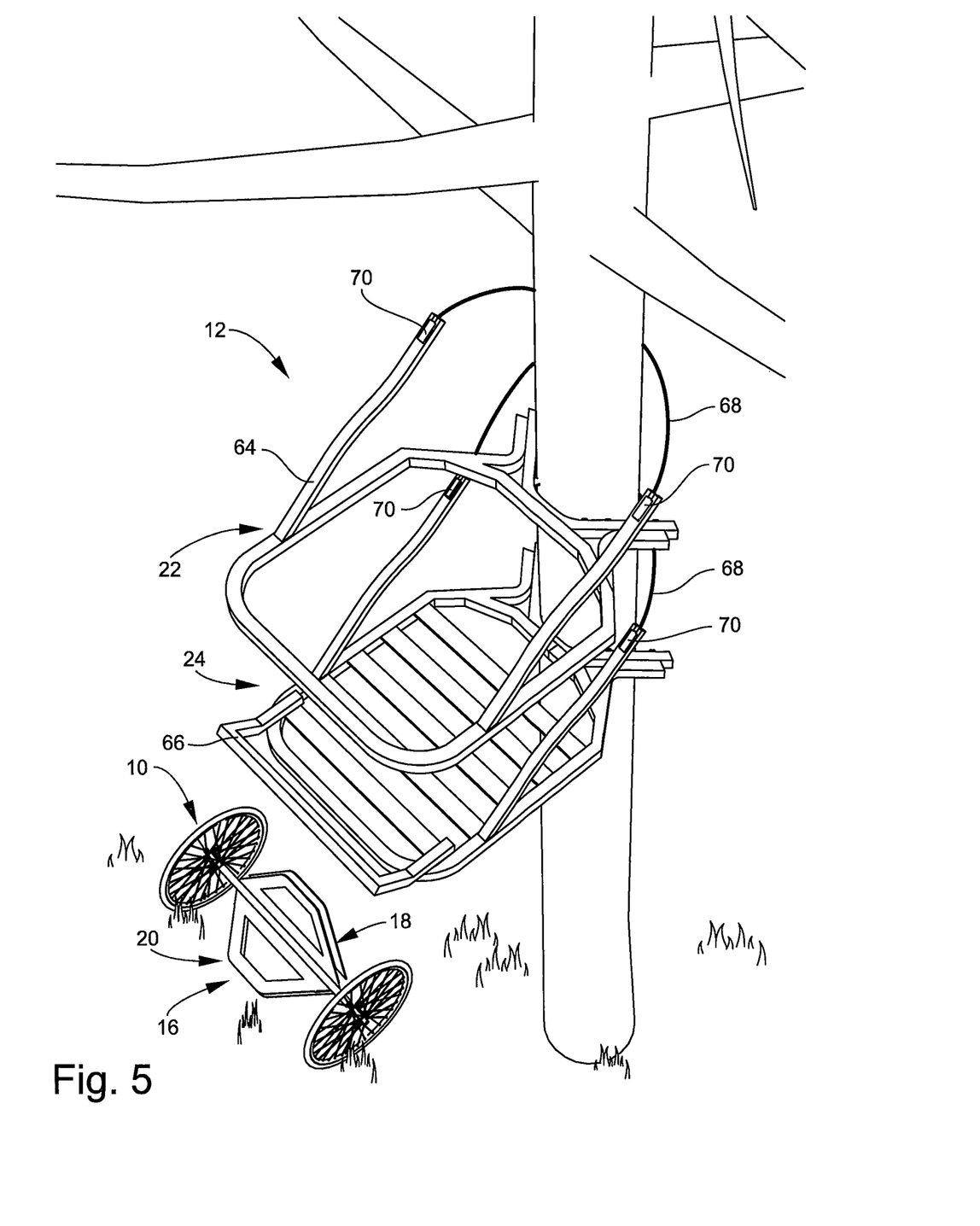
FIG. 5 is an environmental perspective view of a climbing tree stand and a kit according to one embodiment of the instant invention.

An axle 26 may be included on bracket 16 in kit 10 for converting a climbing tree stand 12 into a cart 14. See FIG. 4 Axle 26 may be for providing the axle for wheels 62. Axle 26 may be any sized or shaped axle. Axle 26 may be positioned anywhere on bracket 16. In one embodiment, axle 26 may be positioned in the middle of bracket 16 between first side 18 and second side 20. In one embodiment, axle 26 may be a cylindrical rod extending a small distance beyond both sides of bracket 16. Axle 26 may be a single unitary axle that runs this distance, or it may be divided into two parts with one part of the axle supporting one wheel and the other part of the axle supporting the other wheel. Axle 26 may be made of any material strong enough to support the weight of cart 14 on wheels 62 and any desired weight in cart 14, like steel, aluminum, alloys, other like materials, etc. In one embodiment, axle 26 may be made from a metal, like steel or stainless steel. At least one wheel 62 may be provided on axle 26. In one embodiment, a wheel 62 may be provided on each end of axle 26. The at least one wheel 62 may be any type or sized wheel adapted to rotate on axle 26. For example, the wheels 62 may be a flat-free solid polyurethane tire including, but not limited to, part #16-1.75-⅝ from Marathon Industries of Kent, Wash. The wheels 62 may be held in position onto axle 26 by any means. In one embodiment, each wheel 62 may be held in position on axle 26 by use of a cotter pin (as shown in FIG. 4), nut, or other locking mechanism. A washer may optionally be included between the respective wheel 62 and the locking mechanism.

Bracket 16 may be a single unitary structure adapted for connecting together top part 22 and bottom part 24 of climbing tree stand 12, or bracket 16 may be made from multiple parts for connecting together top part 22 and bottom part 24. As shown in FIG. 4, in one embodiment, bracket 16 may include a first bracket 54 and a second bracket 56. First bracket 54 may include first side 18 on one end and second bracket 56 may include second side 20 on one end. The axle 26 may be positioned anywhere on first bracket 54 and/or second bracket 56. In one embodiment, the axle 26 may be positioned between the first bracket 54 and the second bracket 56. In this embodiment, the axle 26 may be utilized to connect together first bracket 54 and second bracket 56. The first bracket 54 may have a middle tube 58 adapted to receive the axle 26 on the other end from the first side 18 and/or the second bracket 56 may have two outer tubes 60 adapted to receive axle 26 on the other end from second side 20. With this configuration, the middle tube 58 of the first bracket 54 may be sized to fit between the two outer tubes 60 of second bracket 56. With the middle tube 58 positioned between the two outer tubes 60, the axle 26 may be utilized to connect together the first bracket 54 and the second bracket 56 by inserting the axle 26 through the two outer tubes 60 and the middle tube 58. This configuration of the first bracket 54 and second bracket 56 may allow the bracket to rotate about each other via the pivot point of axle 26. In order to lock in the rotation of first bracket 54 relative to second bracket 56, any form of lock may be used, including but not limited to, pins, screws, nails, locks, rivets, grooves, brackets, cables, ties, hook and loop fasteners, cinch-straps, ratchet straps or the like, other like devices, combinations thereof, etc. As shown in the Figures, in one embodiment, the cables 68 from bottom part 24 (or vice versa) may be locked into the connection points 70 on top part 22 (or vice versa) for locking the angle of the first bracket 54 relative to the second bracket 56. This locked in angle of first bracket 54 relative to second bracket 56 may create the angle of cart 14 shown in the Figures, which may aid in keeping objects or game inside of cart 14. In addition, this configuration may eliminate the need for any additional parts or accessories for locking the cart into the desired angled. Furthermore, this configuration may allow the brackets to be easily folded upon each other for easy storage and/or transportation of kit 10 (see FIG. 8). First bracket 54 and second bracket 56 may be designed with similar shapes or may be different. In one embodiment, first bracket 54 may be one half of a hexagon, and second bracket 56 may be the other half of the hexagon. The two brackets 54 and 56 may each be made from a single piece of material cast or stamped out or it may be made from multiple materials attached together, like, by welding. The first bracket 54 and second bracket 56 may be made from any type of material strong enough to support cart 14. In one embodiment, first and second brackets (54 and 56) may be made from aluminum channels. For example, the two brackets may be constructed from aluminum (6063 T52) U-channels 1.25"×1.25"×0.125" welded together. Such aluminum u-channels may be available as part number 13-63-230 from AAC—All Aluminum Company of Asheville, N.C. The middle tube 58 and two outer tubes 60 may also be made of any material strong enough to support axle 26. In one embodiment, middle tube 58 and/or two outer tubes 60 may be constructed from aluminum (6063 T52) round tube ¾"×0.065". Example round aluminum tubing may be available as part number 17-63-100 from AAC—All Aluminum Company of Asheville, N.C. The two brackets 54 and 56 may be made from a single piece of material or it may be made from multiple materials attached together, like, by welding.

The cart 14 may require an angle between top part 22 and bottom part 24 for keeping object like game or other animals in the cart more easily during transportation. The angle between top part 22 and bottom part 24 may be created by an angle within bracket 16 between the first side 18 and the second side 20. In one embodiment, this angle may be a fixed angle between first bracket 54 and second bracket 56. In another embodiment, bracket 16 may be able to pivot about itself for creating the angle for cart 14. Such a pivoting embodiment of bracket 16 may be created by the first bracket 54 having a middle tube 58 and second bracket 56 having two outer tubes 60, where the axle 26 connects together first bracket 54 and second bracket 56 and the axle 26 is the pivot point within bracket 16. In this embodiment, because the first and second brackets pivot freely about each other, the cables 68 (or hook and loop fasteners, cinch-straps, ratchet straps, or the like) and connections 70 of the top part 22 and bottom part 24 may be utilized for locking the cart 14 into the desired angle.

In operation, the climbing tree stand 12 that kit 10 may be utilized on to convert into cart 14 may be any tree stand or climbing tree stand. The climbing tree stand 12 may typically include a top part 22 being a seat climber 64 and a bottom part 24 being a base platform 66. The climbing tree stand 12 may include any optional features or accessories on or attached to seat climber 64 and/or base platform 66. For example, climbing tree stand 12 may include a seat, seat back, arm rests, cushions, etc. on seat climber 64. The kit 10 may convert any size, shape or design of climbing tree stand 12 into a cart 14. The cart 14 would generally include the seat climber 64 attached to one side of the kit 10 and the base platform 66 attached to the other side of the kit 10. The cart 14 may then be easily wheeled around by pushing or pulling either seat climber 64 or base platform 66.

Figure 6A:
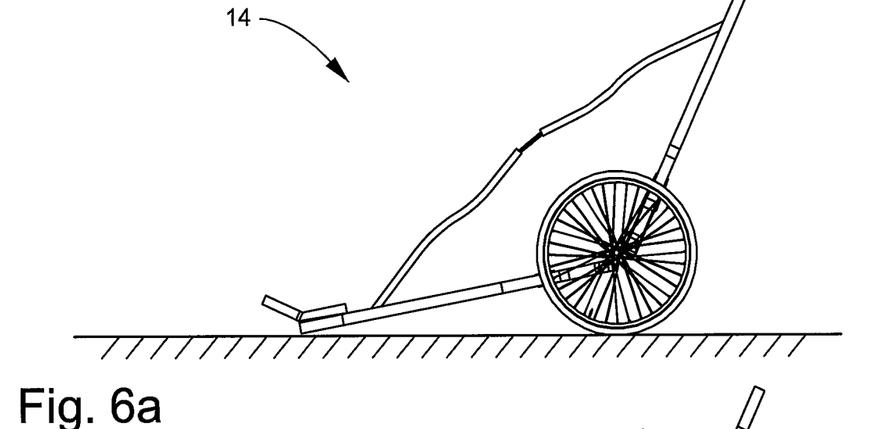
FIGS. 6a-6c are environmental side views of a cart according to one embodiment of the instant invention.
Figure 6B:
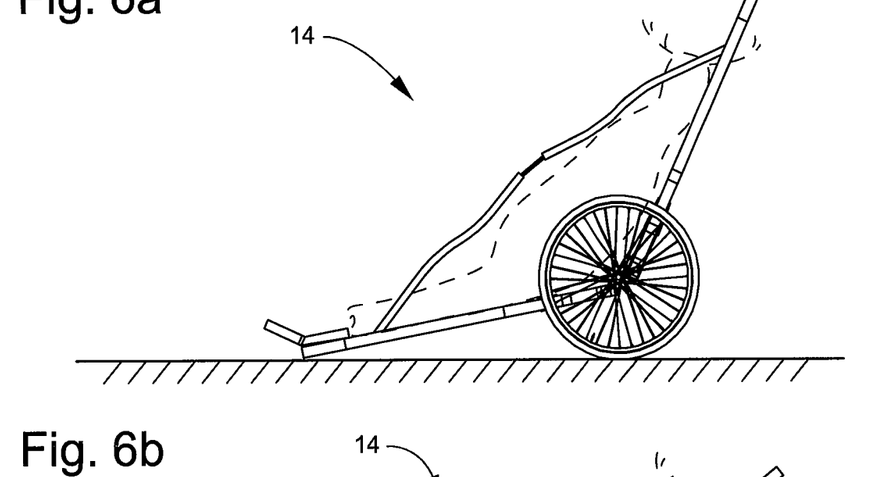
Figure 6C:
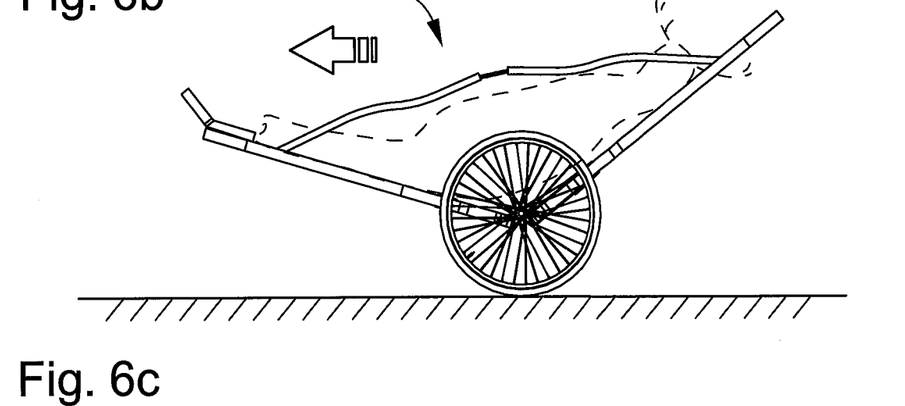

Referring to FIGS. 6a-6c, once the kit 10 is connected to both the top part 22 and bottom part 24, a cart 14 may be formed. As shown in FIG. 6a, the cart 14 may rest on bottom part 24. Although, not shown, cart 14 may also rest on top part 22 in a reverse fashion. As shown in FIG. 6b, while the cart 14 is at rest, game, animals, or other desired objects, may be loaded onto cart 14. As shown in FIG. 6c, once the object is loaded, cart 14 may be leveraged off of bottom part 24 by pulling up on bottom part 24 and/or by pulling down on top part 22. Once both top part 22 and bottom part 24 are leveraged off of the ground so that only wheels 62 are contacting the ground, the cart 14 may be pulled or pushed in either direction.

Figures 7A, 7B:
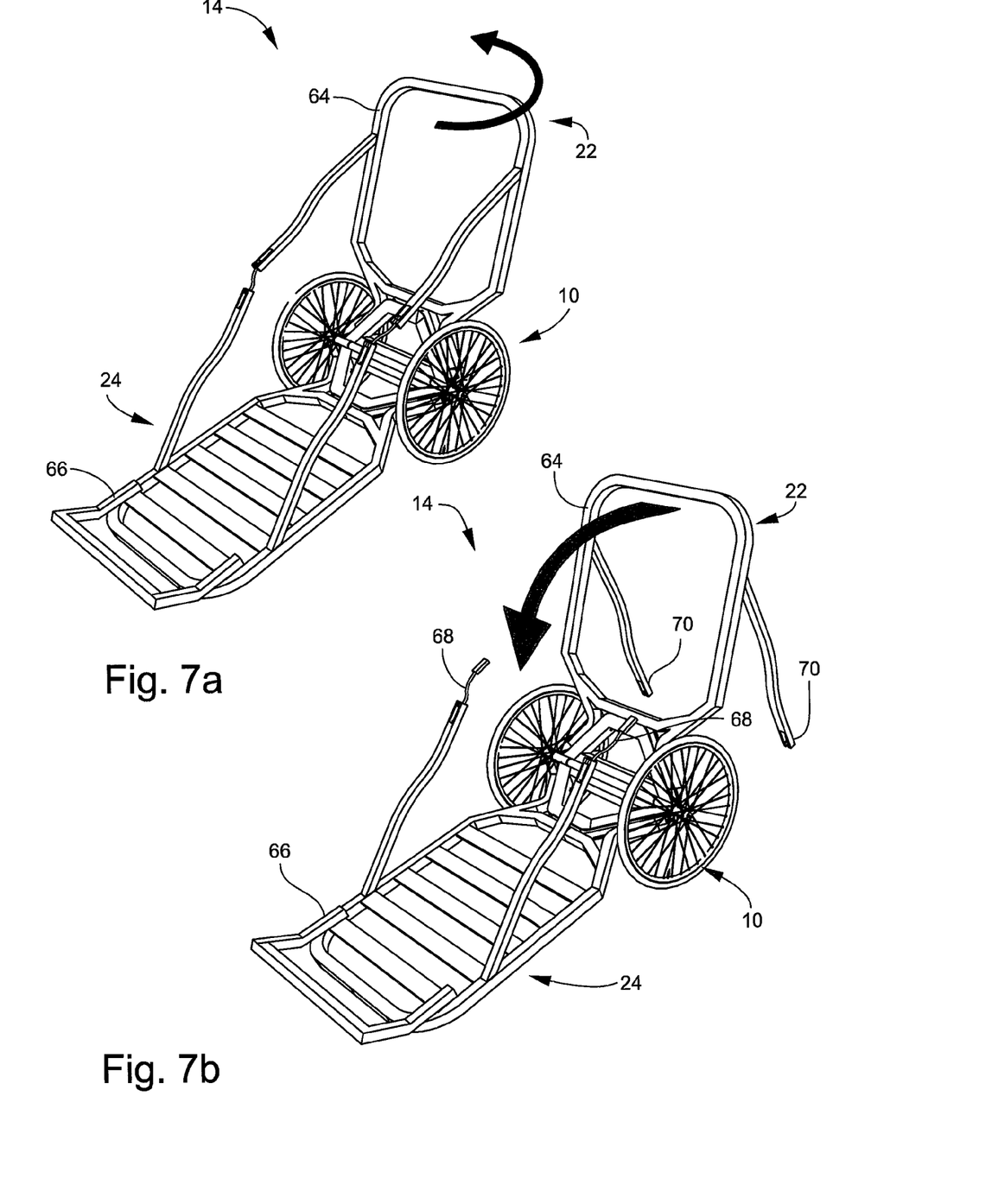
FIGS. 7a-7c are perspective views of a cart according to one embodiment of the instant invention showing one method of folding the cart for transportation and/or storage.
Figure 7C:
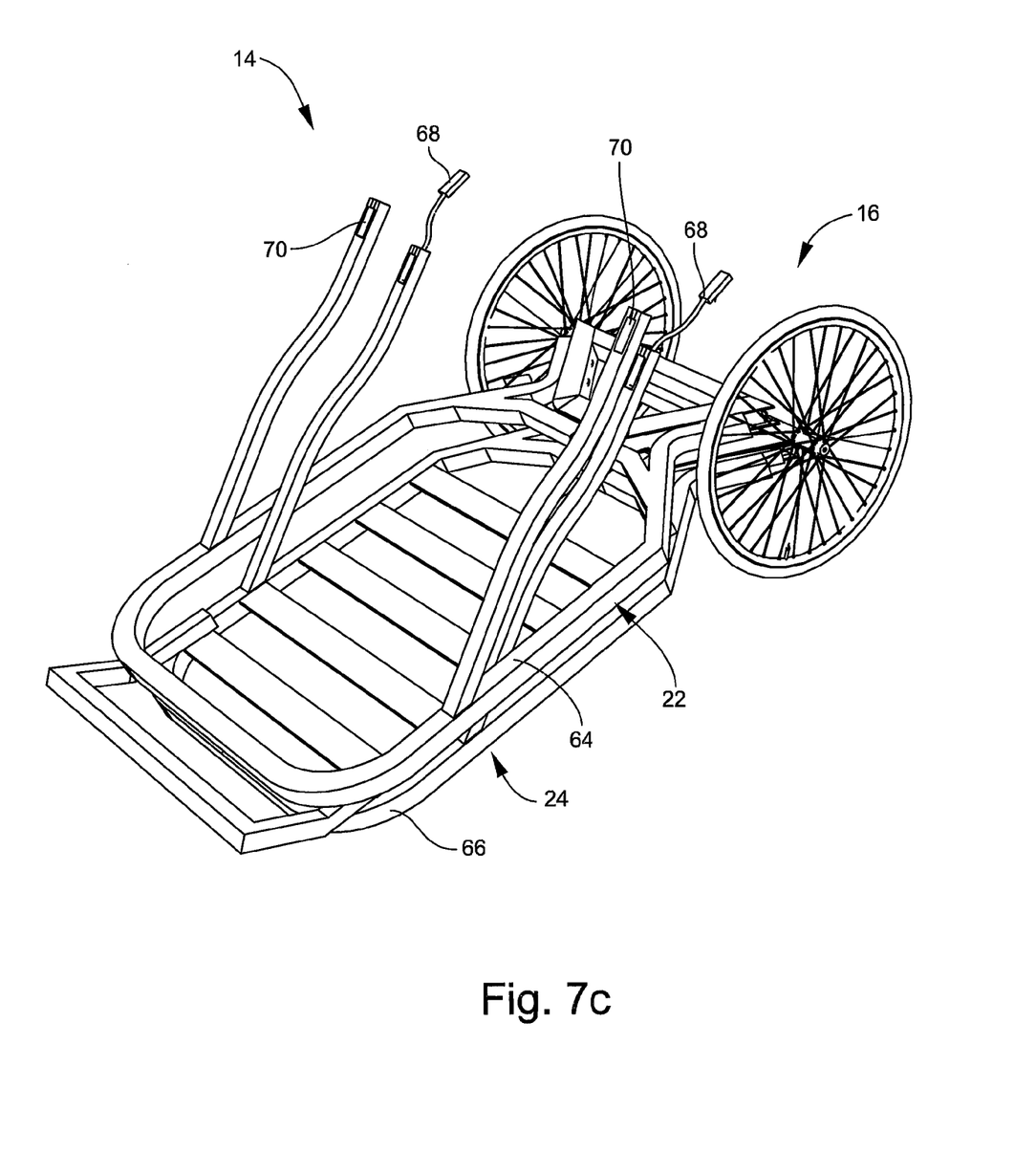

Referring to FIGS. 7a-7c, a method of folding cart 14 is shown for making cart 14 smaller or more compact for transportation and/or storage. As shown in FIGS. 7a-7b, the top part 22 can be removed from bracket 16 and installed in reverse fashion. This will allow top part 22 to fold onto and next into bottom part 24, as shown in FIG. 7c. This method of folding cart 14, may reduce the size of cart 14 which, as one skilled in the art should readily understand, may allow cart 14 to be more easily transported and/or stored.

Figures 8A, 8B:
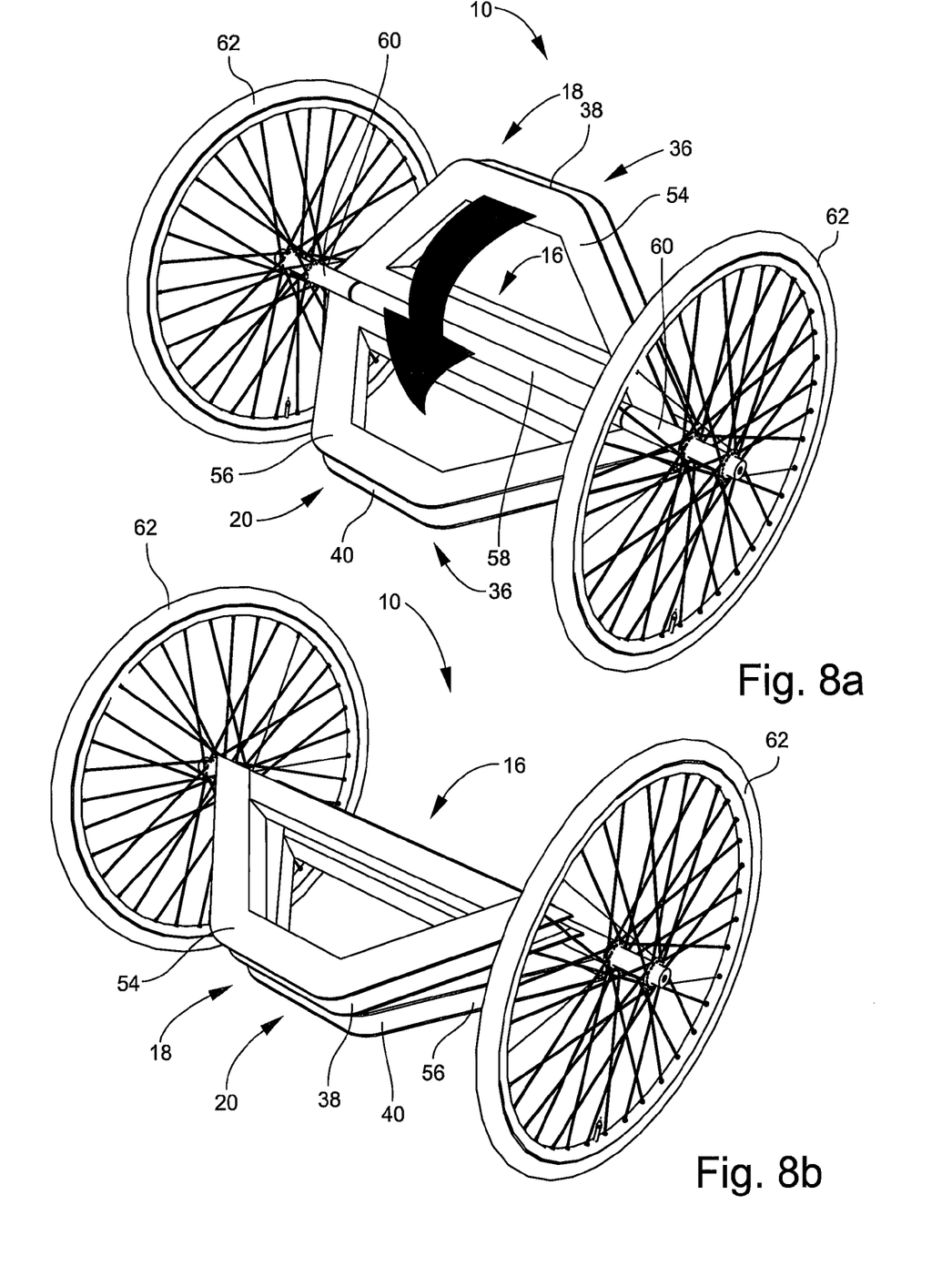
FIGS. 8a-8d are perspective views of a kit according to one embodiment of the instant invention showing one method of folding the kit for transportation and/or storage.
Figure 8C:
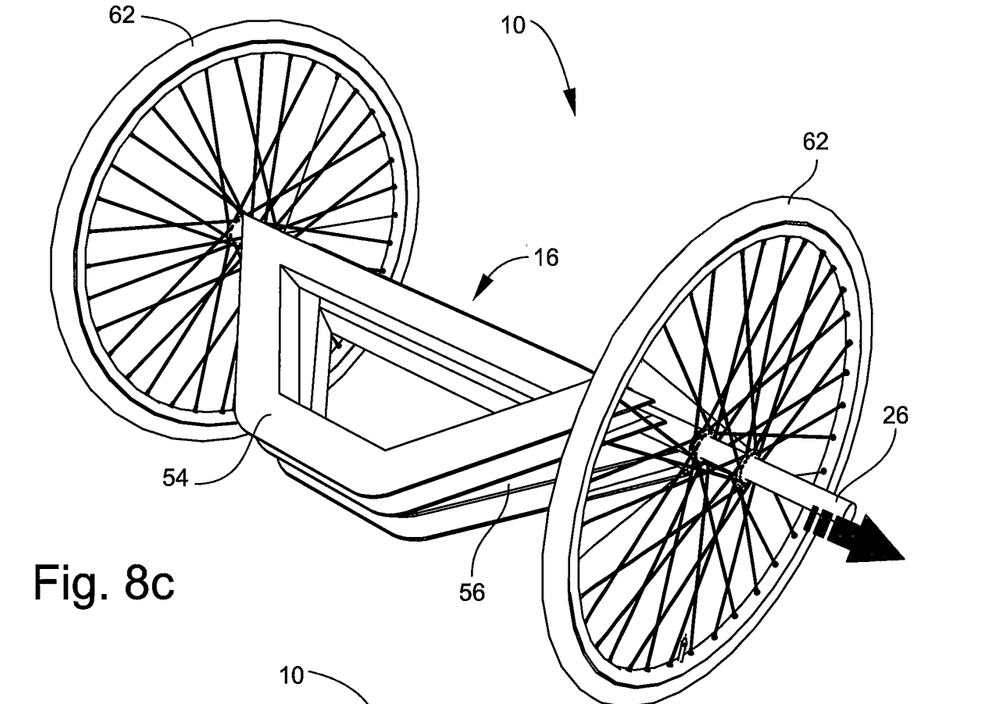
Figure 8D:
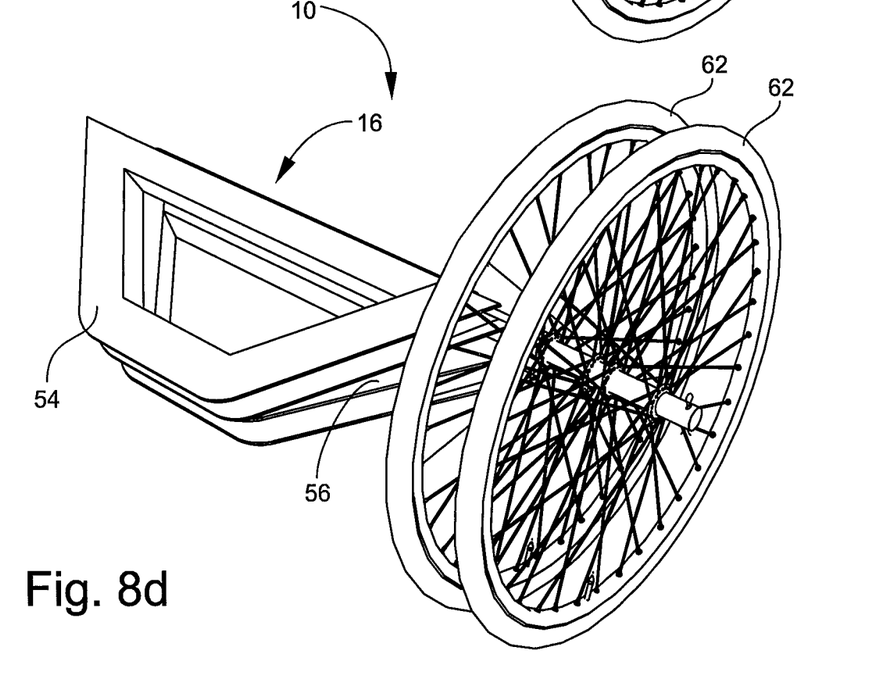

Referring to FIGS. 8a-8d, a method of folding kit 10 is shown for making kit 10 smaller or more compact for transportation and/or storage. As shown in FIGS. 8a-8b, the first step is to fold first bracket 54 onto second bracket 56, or vice versa. Once folded like in FIG. 8b, the kit 10 may be more compact and easier for transportation and storage. This method is used when kit 10 is to be transported and/or stored separate from tree stand 12. As show in FIGS. 8c-8d, if the user prefers, one wheel 62 may be removed off of the axle 26 and added to the same side of the axle 26 as the other wheel 62. This method may also be utilized for transporting kit 10 inside of tree stand 12, when tree stand 12 is folding into a backpack configuration, as known by one skilled in the art. With both wheels 62 positioned on one side of axle 26, the other side of bracket 16 may be relatively compact and thus easily slid into the backpack configuration of the climbing tree stand.

The instant invention also includes a method of converting climbing tree stand 12 into cart 14. This method may include any steps or procedures required to convert climbing tree stand 12 into cart 14. In one embodiment, the method may include the steps of: providing climbing tree stand 12 including: top part 22 that is a seat climber 64; and a bottom part 24 that is a base platform 66; providing kit 10 as shown and described herein, attaching first side 18 of bracket 16 to top part 22 of the climbing tree stand 12; and attaching the second side 20 of the bracket 16 to the bottom part 24 of the climbing tree stand 12.

The present invention may be embodied in other forms without departing from the spirit and the essential attributes thereof, and, accordingly, reference should be made to the appended claims, rather than to the foregoing specification, as indicating the scope of the invention.

I claim:

1. A kit for converting a climbing tree stand into a cart, comprising:
   a top part of a climbing tree stand having a tree gripping means with an inner portion;
   a bottom part of a climbing tree stand having a tree gripping means with an inner portion;
   a bracket having a first side and a second side;
   said first side being shaped to attach to the inner portion of the tree gripping means of the top part of the climbing tree stand;
   said second side being shaped to attach to the inner portion of the tree gripping means of the bottom part of said climbing tree stand; and
   at least one wheel with an axle being positioned on said bracket;
   whereby, said bracket converts said climbing tree stand into a cart by attaching said inner portion of the tree gripping means of the top part of said climbing tree stand to said first side and attaching said inner portion of the tree gripping means of the bottom part of said climbing tree stand to said second side.

2. The kit for converting a climbing tree stand into a cart of claim 1 wherein:
   said first side having a convex shape, and
   said second side having a convex shape.

3. The kit for converting a climbing tree stand into a cart of claim 1 wherein:
   said first side having a first u-shaped channel, and
   said second side having a second-u-shaped channel.

4. The kit for converting a climbing tree stand into a cart of claim 3 wherein:
   said first u-shaped channel being sized to receive teeth of said tree gripping means of said top part, and
   said second u-shaped channel being sized to receive teeth of the tree gripping means of said bottom part.

5. The kit for converting a climbing tree stand into a cart of claim 1 wherein:
   said first side being removably attachable to the top part of said climbing tree stand, and
   said second side being removably attachable to the bottom part of said climbing tree stand.

6. The kit for converting a climbing tree stand into a cart of claim 5 wherein:
   said first side being removably attachable to the top part of said climbing tree stand via a first strap, and
   said second side being removably attachable to the bottom part of said climbing tree stand via a second strap.

7. The kit for converting a climbing tree stand into a cart of claim 6 wherein:
   said first strap including a first cinch strap for securing the strap around said first side and the top part of said climbing tree stand, and
   said second strap including a second cinch strap for securing the strap around said second side and the bottom part of said climbing tree stand.

8. The kit for converting a climbing tree stand into a cart of claim 1 wherein said bracket comprising:
   a first bracket with said first side on one end; and
   a second bracket with said second side on one end.

9. The kit for converting a climbing tree stand into a cart of claim 8 wherein said axle being positioned between said first bracket and said second bracket.

10. The kit for converting a climbing tree stand into a cart of claim 9 wherein said axle connecting together said first bracket and said second bracket.

11. The kit for converting a climbing tree stand into a cart of claim 10 wherein said first bracket having a middle tube adapted to receive said axle on the other end from said first side, and said second bracket having two outer tubes adapted to receive said axle on the other end from said second side, where said middle tube of said first bracket being sized to fit between said two outer tubes of said second bracket.

12. The kit for converting a climbing tree stand into a cart of claim 11 whereby said axle connecting together said first bracket and said second bracket by positioning said middle tube between said two outer tubes and inserting said axle through said two outer tubes and said middle tube.

13. The kit for converting a climbing tree stand into a cart of claim 1 wherein said at least one wheel includes two wheels, where said axle having a wheel on both ends.

14. A kit for converting a climbing tree stand into a cart, comprising:
   a top part of a climbing tree stand having a tree gripping means with an inner portion;
   a bottom part of a climbing tree stand having a tree gripping means with an inner portion;
   a bracket having a first side and a second side;

said first side being shaped to attach to the tree gripping means with teeth of the top part of the climbing tree stand, wherein said first side having a first u-shaped channel sized to receive the teeth of the tree gripping means of said top part;

said second side being shaped to attach the tree gripping means with teeth of the bottom part of said climbing tree stand, wherein said second side having a second u-shaped channel sized to receive the teeth of the tree gripping means of said bottom part; and at least one wheel with an axle being positioned on said bracket;

whereby, said bracket converts said climbing tree stand into a cart by attaching said tree gripping means with teeth of the top part of said climbing tree stand to said first side and attaching said tree gripping means with teeth of the bottom part of said climbing tree stand to said second side.

15. A kit for converting a climbing tree stand into a cart, comprising:

a top part of a climbing tree stand and a bottom part of a climbing tree stand;

a bracket having a first side and a second side;

said first side being shaped to attach to the top part of the climbing tree stand, wherein said first side being removably attachable to the top part of said climbing tree stand via a first strap;

said second side being shaped to attach the bottom part of said climbing tree stand, wherein said second side being removable attachable to the bottom part of said climbing tree stand via a second strap; and at least one wheel with an axle being positioned on said bracket;

whereby, said bracket converts said climbing tree stand into a cart by attaching said top part of said climbing tree stand to said first side and attaching said bottom part of said climbing tree stand to said second side.

16. A kit for converting a climbing tree stand into a cart comprising: a top part of a climbing tree stand and a bottom part of a climbing tree stand;

a bracket having a first side and a second side;

said first side being shaped to attach to a top part of the climbing tree stand;

said second side being shaped to attach a bottom part of said climbing tree stand; and at least one wheel with an axle being positioned on said bracket;

wherein, said bracket comprising:

a first bracket with said first side on one end; and a second bracket with said second side on one end;

said axle being positioned between said first bracket and said second bracket;

wherein, said axle connecting together said first bracket and said second bracket; and wherein, said first bracket having a middle tube adapted to receive said axle on the other end from said first side, and said second bracket having two outer tubes adapted to receive said axle on the other end from said second side, where said middle tube of said first bracket being sized to fit between said two outer tubes of said second bracket;

whereby, said bracket converts said climbing tree stand into a cart by attaching said top part of said climbing tree stand to said first side and attaching said bottom part of said climbing tree stand to said second side.

* * * * *